(12) United States Patent
Snodgrass et al.

(10) Patent No.: US 9,948,531 B2
(45) Date of Patent: *Apr. 17, 2018

(54) PREDICTIVE PREFETCHING TO REDUCE DOCUMENT GENERATION TIMES

(71) Applicant: Amazon Technologies, Inc., Seattle, WA (US)

(72) Inventors: Ryan J. Snodgrass, Kirkland, WA (US); Colin L. Lazier, Seattle, WA (US); Paul G. Nordstrom, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

This patent is subject to a terminal disclaimer.

(21) Appl. No.: 14/059,310

(22) Filed: Oct. 21, 2013

(65) Prior Publication Data

US 2014/0082149 A1 Mar. 20, 2014

Related U.S. Application Data

(63) Continuation of application No. 13/399,781, filed on Feb. 17, 2012, now Pat. No. 8,566,788, which is a continuation of application No. 11/954,175, filed on Dec. 11, 2007, now Pat. No. 8,136,089, which is a
(Continued)

(51) Int. Cl.
*G06F 17/30* (2006.01)
*H04L 12/26* (2006.01)
*H04L 29/08* (2006.01)

(52) U.S. Cl.
CPC ........ *H04L 43/08* (2013.01); *G06F 17/30893* (2013.01); *G06F 17/30902* (2013.01); *H04L 67/02* (2013.01); *H04L 67/2847* (2013.01)

(58) Field of Classification Search
None
See application file for complete search history.

(56) References Cited

U.S. PATENT DOCUMENTS 5,305,389 A 4/1994 Palmer
5,802,292 A 9/1998 Mogul
5,835,905 A * 11/1998 Pirolli et al.
(Continued)

OTHER PUBLICATIONS

Cooksey, R., Jourdan, S., and Grunwald, D., "A Stateless, Content-Directed Data Prefetching Mechanism," Proceedings of the 10th International Conference on Architectural Support for Programming Languages and Operating Systems, pp. 279-290, San Jose, California (2002) (of-record in parent application).

*Primary Examiner* — Isaac T Tecklu
(74) *Attorney, Agent, or Firm* — Knobbe Martens Olson & Bear LLP

(57) ABSTRACT

In a system in which documents are generated dynamically in response to user requests, historical data is collected regarding data retrieval subtasks, such as service requests, that are performed to generate such documents. This data is used to predict the specific subtasks that will be performed to respond to specific document requests, such that these subtasks may be initiated preemptively at or near the outset of the associated document generation task. In one embodiment, the historical data is included within, or is used to generate, a mapping table that maps document generation tasks (which may correspond to specific URLs) to the data retrieval subtasks that are frequently performed within such tasks.

23 Claims, 3 Drawing Sheets

Related U.S. Application Data continuation of application No. 10/612,529, filed on Jul. 2, 2003, now Pat. No. 7,331,038.

(56) References Cited

U.S. PATENT DOCUMENTS

| | | | |
|---|---|---|---|
| 5,867,706 A * | 2/1999 | Martin et al. ............... 718/105 |
| 5,895,470 A * | 4/1999 | Pirolli et al. ................ 707/727 |
| 6,018,764 A * | 1/2000 | Field et al. .................. 709/217 |
| 6,032,196 A * | 2/2000 | Monier ........................ 709/245 |
| 6,067,565 A * | 5/2000 | Horvitz ....................... 709/218 |
| 6,085,193 A * | 7/2000 | Malkin et al. |
| 6,108,668 A * | 8/2000 | Bates et al. |
| 6,111,575 A * | 8/2000 | Martinez et al. ............ 715/810 |
| 6,115,718 A * | 9/2000 | Huberman et al. |
| 6,185,591 B1 * | 2/2001 | Baker et al. ................. 715/210 |
| 6,192,378 B1 * | 2/2001 | Abrams et al. |
| 6,230,196 B1 * | 5/2001 | Guenthner et al. .......... 709/223 |
| 6,374,305 B1 | 4/2002 | Gupta et al. |
| 6,598,048 B2 | 7/2003 | Carneal et al. |
| 6,871,218 B2 * | 3/2005 | Desai et al. ................. 709/213 |
| 6,959,318 B1 * | 10/2005 | Tso ............................. 709/203 |
| 6,981,017 B1 * | 12/2005 | Kasriel et al. ............... 709/203 |
| 6,993,591 B1 * | 1/2006 | Klemm ....................... 709/232 |
| 7,343,397 B2 * | 3/2008 | Kochanski ................... 709/218 |
| 7,363,291 B1 * | 4/2008 | Page ............................ 707/706 |
| 7,472,349 B1 | 12/2008 | Srivastava et al. |
| 7,548,982 B2 * | 6/2009 | Gu et al. ...................... 709/228 |
| 7,676,034 B1 | 3/2010 | Wu et al. |
| 2002/0010753 A1 | 1/2002 | Matsuoka et al. |
| 2002/0059223 A1 * | 5/2002 | Nash et al. ..................... 707/5 |
| 2002/0078165 A1 * | 6/2002 | Genty et al. ................. 709/217 |
| 2002/0120685 A1 | 8/2002 | Srivastava et al. |
| 2002/0143802 A1 * | 10/2002 | Chi et al. ..................... 707/203 |
| 2002/0147895 A1 * | 10/2002 | Glance et al. ............... 711/158 |
| 2002/0161824 A1 * | 10/2002 | Harris .......................... 709/202 |
| 2002/0174384 A1 * | 11/2002 | Graichen et al. .............. 714/37 |
| 2003/0061451 A1 * | 3/2003 | Beyda .......................... 711/137 |
| 2003/0088580 A1 * | 5/2003 | Desai et al. ................ 707/104.1 |
| 2003/0128233 A1 * | 7/2003 | Kasriel ......................... 345/738 |
| 2003/0163444 A1 * | 8/2003 | Kotzin ............................ 707/1 |
| 2003/0225859 A1 * | 12/2003 | Radia et al. ................. 709/219 |
| 2004/0088375 A1 * | 5/2004 | Sethi et al. .................. 709/218 |
| 2004/0098486 A1 * | 5/2004 | Gu et al. ...................... 709/228 |
| 2004/0128618 A1 * | 7/2004 | Datta ........................... 715/513 |
| 2004/0133563 A1 * | 7/2004 | Harvey et al. .................. 707/3 |
| 2004/0210826 A1 * | 10/2004 | Najork ....................... 715/501.1 |
| 2004/0255048 A1 | 12/2004 | Lev Ran et al. |
| 2004/0267739 A1 * | 12/2004 | Dowling .......................... 707/3 |
| 2007/0022102 A1 | 1/2007 | Saxena |
| 2007/0156677 A1 | 7/2007 | Szabo |
| 2008/0091711 A1 * | 4/2008 | Snodgrass et al. ........... 707/102 |

* cited by examiner

PREDICTIVE PREFETCHING TO REDUCE DOCUMENT GENERATION TIMES

RELATED APPLICATIONS

This application is a continuation of U.S. application Ser. No. 13/399,781, filed Feb. 17, 2012, which is a continuation of U.S. application Ser. No. 11/954,175, filed Dec. 11, 2007 (now U.S. Pat. No. 8,136,089), which is a continuation of U.S. application Ser. No. 10/612,529, filed Jul. 2, 2003 (now U.S. Pat. No. 7,331,038), the disclosure of which is hereby incorporated by reference.

BACKGROUND OF THE INVENTION

Field of the Invention

The present invention relates to techniques for reducing document generation times in systems that dynamically generate web pages or other electronic documents in response to user requests. More specifically, the invention relates to software architectures and predictive prefetching methods for increasing the degree to which document generation subtasks can be performed in parallel.

Description of the Related Art

The task of dynamically generating a requested electronic document, such as a web page, commonly involves the execution of multiple data retrieval subtasks. Each such subtask may, for example, involve the generation of a service request for content used to generate the requested document. To reduce document generation times, some or all of these data retrieval subtasks may, in some cases, be performed in parallel. In many cases, however, the data retrieval subtasks cannot be performed in parallel because one subtask is dependent upon the results of another.

For example, the task of generating a web page may involve sending an initial service request to a service that returns a variable list of items represented within a database. For each item in this list, a second service may then be called to request catalog content or other data associated with that item. Assuming the list of items can vary from one page rendering event to the next, the details of the calls to the second service cannot be accurately determined until the first service has returned the list. Consequently, using existing methods, the requests to the second service must be postponed until the initial service request is completed.

SUMMARY

The above and other problems are addressed by preemptively initiating selected data retrieval subtasks, such as selected service requests, to prefetch data that is deemed likely to be used to generate requested documents. Data retrieved unnecessarily as the result of preemptive subtask initiation may be ignored.

The subtasks to be performed preemptively in response to a given document request are preferably selected based at least in part on predictions of the subtasks that will be used to generate the requested document. These predictions may be based on historical data regarding the subtasks actually used to generate specific documents. For example, in one embodiment, historical data is used to build a mapping table that maps specific document generation tasks to corresponding sets of subtasks that have been performed previously as part of such tasks. The mapping table may, for example, map a particular dynamically generated web page to a set of subtasks that have been performed at least N % of the times the web page has been generated. When a particular document request is received from a user, this table is used to look up a set of one or more subtasks that are to be initiated immediately. Criteria other than subtask frequency-of-use may also be incorporated into the selection process.

In one embodiment, the mapping table is updated in real time to reflect the subtasks actually used to generate specific documents, such that the subtask "predictions" adapt automatically in real time. The mapping table may alternatively be updated or generated periodically based on an off-line analysis of collected data.

Neither this summary nor the following detailed description purports to define the invention. The invention is defined by the claims.

DETAILED DESCRIPTION OF THE PREFERRED EMBODIMENTS

For illustrative purposes only, the invention will be described largely in the context of a web site system that provides access to an electronic catalog of items represented in a database. The items may, for example, be physical products, journal articles, news articles, auctions, web sites, businesses, music files, or any other type of item that can be represented within a database. As will be recognized, the invention is also applicable to other types of dynamic web page applications. In addition, the invention may be applied to the dynamic generation of other types of electronic documents, such as voiceXML documents and email documents.

I. Overview

Figure 1:
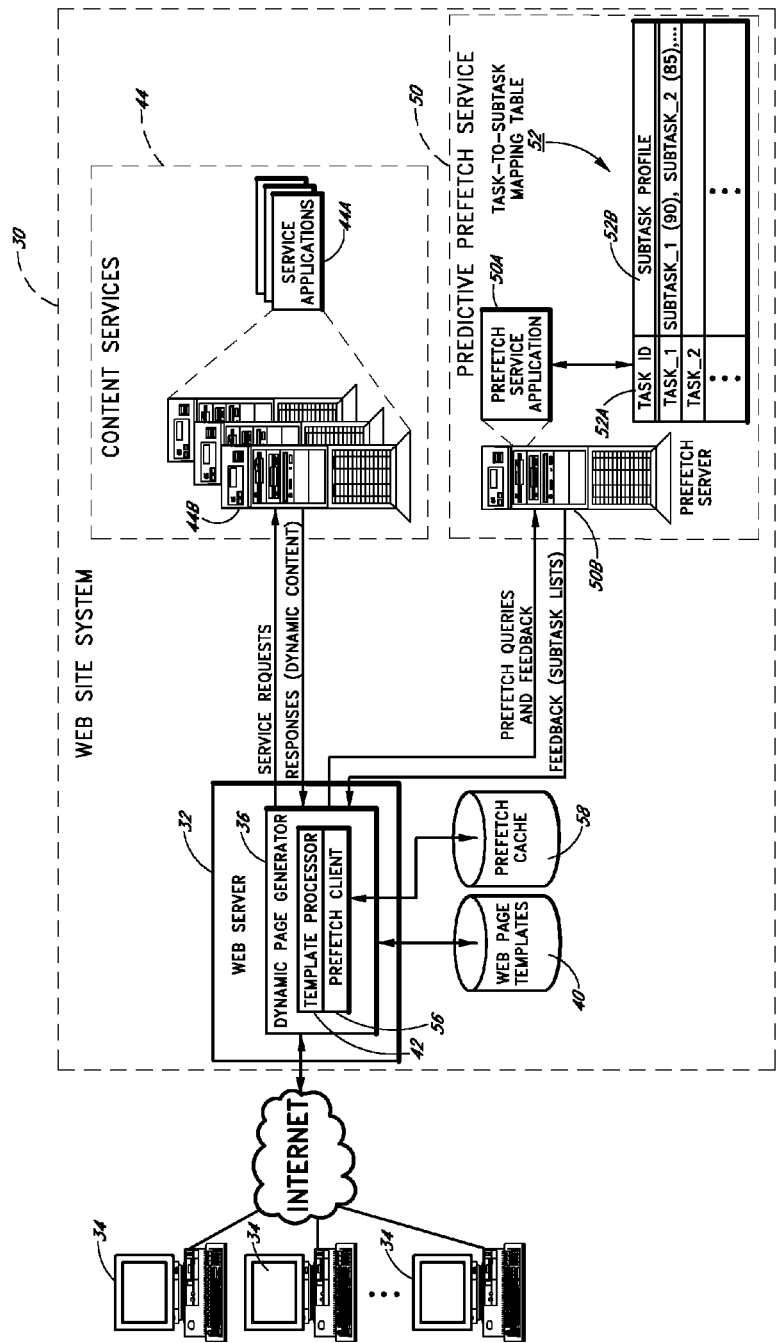
FIG. 1 illustrates a web site system that uses predictive prefetching to dynamically generate web pages according to one embodiment of the invention.

FIG. 1 illustrates a web site system 30 according to one embodiment of the invention. The system 30 includes one or more web server machines 32 (one shown) that respond to requests from user computers 34 by generating and returning web pages. Each such web server machine ("web server") executes a dynamic page generator program 36 that generates the web pages in response to such requests (i.e., the web pages are generated dynamically).

The dynamic page generator 36 preferably generates the web pages according to web page templates stored in a database 40, as is known in the art. For example, an item detail page template may be used to generate item detail pages for each of the catalog items represented in a database. Similarly, a browse node template may be used to generate pages that correspond to specific nodes of a hierarchical browse structure in which the catalog items are arranged by category. Many different templates may, of course, be provided within a given system 30. Although templates are used in the preferred embodiment, the invention does not require the use of templates.

As depicted in FIG. 1, the dynamic page generator 36 includes a template processor 42 that is responsible for processing the web page templates, and for generating service requests specified by such templates. When a page request is received by the web server 32, the template processor 42 retrieves and processes the corresponding template, which may be uniquely identified by the target URL (Uniform Resource Locator) included within the page request. Typically, this template will specify one or more service requests that are to be sent to specific services 44 to retrieve content for generating the requested page. These services 44 are referred to herein as "content services," as they return data that is included within, or that otherwise affects the content of, the requested web pages.

To facilitate parallel execution of the service requests associated with a given page request, the template processor 42 preferably uses a linear thread to sequentially process each web page template, and uses an event-driven thread to generate and wait for the results of the associated service requests. Other software architectures that support the parallel execution of page generation tasks may alternatively be used.

As illustrated in FIG. 1, each content service 44 is typically in the form of a service application 44A that runs on one or more physical servers 44B. Many tens or hundreds of different content services 44 may be provided within a given system 30. The types and functions of these services 44 may vary widely depending on the nature and purpose of the particular web site system 30 (e.g., business-to-consumer sales, access to online publications, Internet searching, job postings, online banking, etc.).

In many cases, the input parameter(s) or other details of a given service request remain unknown during template processing until the results of one or more other service requests are completed. To provide a simple example, suppose that each item detail page generated by the web site system 30 includes a "similar items" section that displays short descriptions of three items that are deemed to be similar to the item featured on the page. To generate the similar items section, a request is initially sent to a Similar Items service 44 to obtain the IDs three items that are similar to the featured item. The IDs of these three similar items are then used as input parameters of respective service calls to a Catalog service 44, which responds by returning short item descriptions that are incorporated into the requested page. Assume also that the Similar Items service 44 uses an algorithm that provides a degree of variability, such that the three similar items listed on a particular item detail page may change over time in response to user activity, changes to the catalog, and/or other factors.

If the requests to the Catalog service 44 in this example are blocked or otherwise postponed until the Similar Items service 44 returns the list of similar items, the page generation time will be adversely affected. This problem is compounded when a greater level of service request dependency or "chaining" exists. For instance, a first service request may return a result that is used to generate a second service request, and the result of the second service request may then be used as a parameter of a third service request, and so on. If these chained service requests are performed sequentially rather than in parallel, the time required to generate the page will be at least as long as the sum of the response times of the individual service requests.

The preferred embodiment of the present invention addresses this problem by using a predictive prefetch service 50 to identify those service requests that are likely to be made as part of a page generation task. The predictive prefetch service 50 (hereinafter "prefetch service") preferably makes these predictions based on statistical data regarding service requests made during prior renderings of the requested web page and/or related web pages. The service requests identified by the prefetch service 50 as being probable are then made "preemptively" at or near the outset of the page generation task, rather waiting for requests to other content services 44 to be completed. If a given service request is made unnecessarily (i.e., the prediction is wrong), the associated data returned by the particular content service 44 is ignored. Data regarding of the accuracy of the predictions is collected over time by monitoring the dynamic page generation process, and is used to adaptively modify the predictions.

For instance, assume that a user request is received for an item detail page for item 12345, and that item detail pages are generated as described above. The prefetch service 50 may access a repository of historical/statistical data to determine that requests for the item detail page for item 12345 have resulted in service requests being made as follows, disregarding any service requests made unnecessarily due to prefetching:

| Service: Request | % of time made |
| --- | --- |
| Catalog: full description of item 12345 | 100 |
| Similar Items: items similar to item 12345 | 100 |
| Catalog: short description of item 23456 | 96 |
| Catalog: short description of item 34567 | 93 |
| Catalog: short description of item 45678 | 87 |
| Catalog: short description of item 56789 | 82 |
| Catalog: short description of item 67890 | 25 |

As described below, this statistical data may be derived from a particular set of activity data, such as activity data collected over the last M days or weeks. If a frequency threshold of 80% is used to select the service requests that are to be made preemptively, the first six of these service requests will be made at or shortly after the outset of the page generation task. The item detail page will ordinarily be generated in less time than would be required if the requests for the short descriptions of the similar items were postponed until completion of the Similar Items service request.

Service requests are one example of a type of document generation subtask that can be performed predictively/preemptively in accordance with the invention. The prefetch service 50 can also be used to identify, and preemptively perform, other types of document generation subtasks, including but not limited to other types of data retrieval subtasks. For instance, predictive prefetching may be used to identify, and preemptively perform, database lookup operations that do not involve the generation of a service request.

The data retrieval subtasks that are performed preemptively in accordance with the invention may involve the retrieval of static data and/or dynamically generated data. The retrieved data may be data that is not actually incorporated into the requested web page or other document. For example, a service request may be issued preemptively for purposes of confirming that the user is authorized to access a particular resource, or to initiate validation of a credit card; in both of these examples, the retrieved data may be a status value indicating the outcome of the service request.

FIG. 1 illustrates the components and the basic operation of the prefetch service 50. The service 50 is implemented as a prefetch service application 50A that runs on a prefetch server 50B. The prefetch service application 50A may alternatively run on the web server machine(s) 32, or on a physical server that is also used to implement one or more other services. Although a single prefetch server 50B is shown, the prefetch service application 50A may be replicated across multiple physical servers to accommodate large numbers of concurrent page requests.

As illustrated, the prefetch service application 50A accesses a task-to-subtask mapping table 52 that maps tasks to corresponding subtasks. This mapping table 52 is used to identify the set of service requests, or other subtasks, that are to be performed preemptively for a given page generation task. Each entry in the mapping table 52 includes a task identifier portion 52A that describes a particular task. As discussed below, a given task identifier may, for example, correspond to a particular URL, or to a collection of URLs that point to a common web page or web page template. The task-to-subtask mapping table 52 may, for example, be stored as a hash table or a B-tree. As will be recognized, however, the mapping table 52 can be implemented using any type of data structure or set of data structures capable of mapping tasks to subtasks.

Each table entry also includes an associated "subtask profile" portion 52B that specifies associated subtasks that have been performed frequently as part of the identified task. For example, the subtask profile 52B for a given task may specify all of the service requests that are properly made at least 80% of the time that task is performed. In the embodiment depicted in FIG. 1, each subtask is listed together with a score value (shown in parenthesis) that generally represents the importance of performing that particular subtask preemptively.

In one embodiment, each such score value is a frequency-of-use score reflecting the frequency with which the respective subtask has been performed as part of the corresponding task over a defined time period. For example, assuming frequency-of-use scores are used, the table 52 in FIG. 1 indicates generally that subtask_1 has been performed 90% of the time task_1 has been performed, excluding unnecessary occurrences of subtask_1 caused by predictive prefetching. A subtask which is performed unnecessarily as the result of prefetching is not considered as being performed "as part of" the task, and is referred to herein as being "unused." Such unnecessarily performed subtasks are not counted when generating the frequency-of-use scores, so that the scores accurately reflect actual subtask usage. In this example, each score value generally represents the probability that the particular subtask will be used as part of the corresponding task.

The scores may optionally be generated so as to give greater weight to the most recent occurrences of the relevant page generation tasks than to earlier page generation events. In addition, other criteria may be taken into consideration in generating the scores, such as the average execution time of the particular subtask, and/or the average point at which the subtask is ordinarily performed within the overall page generation event (e.g., at the outset versus near the end of the page generation task). Although score values are depicted in FIG. 1, they may alternatively be omitted from the table 52, or may be generated on-the-fly from other data values stored in the table 52.

Subtasks that occur only at the outset of a given page generation task may be omitted from the relevant table entry since there is little or no benefit to initiating such subtasks preemptively.

The dynamic page generator component that communicates with the prefetch service 50 is referred to herein as the prefetch client 56. As described below, the prefetch client 56 is responsive to a URL/page request by querying the prefetch service 50 for a list of the service requests (subtasks) that are likely to be performed during generation of the requested page. Upon obtaining this list, the prefetch client 56 or another component of the dynamic page generator 36 determines whether the template processor 42 has already made one or more of the specified service requests, and to the extent is has not, makes these service requests preemptively. If the template processor 42 thereafter attempts to make a service request that has already been made preemptively, the redundant service request is ignored or is otherwise prevented from being sent.

Once the page generation task is complete, the prefetch client 56 may send an "end-of-page feedback" message to the prefetch service 50 specifying some or all of the service requests that were actually used to generate the requested page. This allows the prefetch service 50 to monitor the accuracy of its predictions. As described below, the prefetch service preferably uses such feedback messages to update the task-to-subtask mapping table—in real time and/or on a periodic basis. By updating this table 52 based on the feedback messages, the prefetch service 50 adaptively modifies its predictions of the service requests (subtasks) that will be performed.

As illustrated in FIG. 1, the prefetch client 58 may access a prefetch cache 58, which may be implemented with random access memory and/or hard disk storage of the web server machine(s) 32. The prefetch cache 58 is preferably used to cache data retrieved from the prefetch service 50 in order to reduce the frequency with which queries are sent to the prefetch service. For example, the cache 58 may store the subtask profile data for some or all of the most frequently accessed web pages, so that requests for these pages can be processed on most page requests without querying the prefetch service 50. Each entry in the prefetch cache 58 may correspond to a particular entry in the task-to-subtask mapping table 52, and may be created or updated based on data returned by the prefetch service. In one embodiment, the prefetch service 50 assigns a time-to-live (TTL) value to each such cache entry to specify how long the associated entry may be used. The TTL value for a given task ID may be generated based on collected historical data indicative, for example, of how often new subtasks are added to the associated subtask profile 52B.

The system 30 may, if necessary, be configured to prevent certain types of service requests from being performed preemptively. For example, the system may be prevented from preemptively issuing service requests that cause database updates to occur. This may be accomplished, for example, by configuring the prefetch client 56 and/or the prefetch service 50 to allow prefetching only for services 44 identified in an "opt-in" list.

II. Task-to-Subtask Mapping Table

For simple web site systems, a separate entry may be provided in the mapping table 52 for every possible URL that may be requested by a user. In more complex systems, some or all of the task identifiers 52A may be sufficiently broad to encompass multiple possible URLs that point to the same web page or to a set of related web pages (such as those that correspond to the same template). For example, the task identifier [page type=browse node; node ID=5ACFD] may encompass all URLs that point to the browse node page for node 5ACFD. Thus, although a given URL request for this browse node page may include various parameters that specify, for example, the state of the user's browsing session, these parameters may be ignored for purposes of looking up the associated subtasks to be performed. To provide another example, the task identifier [page type=browse node, node ID=?] may encompass all browse node pages, all of which may share a common template.

Further, a degree of overlap may be provided between the task identifiers 52A included within the mapping table 52. For example, one table entry may be provided for each of the most frequently accessed item detail pages, while another table entry may be provided that is generic to all item detail pages. The generic "item detail page" entry would specify those subtasks, if any, that are frequently performed for all item detail pages, and may be used if no table entry exists for the particular item detail page being requested. For example, assume that a particular catalog item is a new addition to the catalog, or is accessed very infrequently. In either case, it may not be practical or desirable to include a separate table entry for this item's detail page. When the item's detail page is requested, the generic "item detail page" entry may therefore be used to identify any service requests or other subtasks that are to be performed preemptively. Assuming certain subtasks are commonly performed for all item detail pages, an increased level of subtask parallelization may be realized in this example over the case in which no prefetching is performed.

In the embodiment depicted in FIG. 1, the task-to-subtask mapping table 52 preferably serves as a repository of historical data regarding service requests made, or other subtasks performed, for specific tasks. For example, for each task identifier 52A, the mapping table 52 may store a listing of some or all of the subtasks that have historically been performed as part of the corresponding task, including the input parameters of such subtasks. Each such subtask may be listed in the subtask profile portion 52B of the table entry together with some or all of the following statistical data: (a) the number of times that particular subtask has been performed since inception or over a defined time period, excluding "unused" subtasks performed due to prefetching (note that this number can be divided by the total number of occurrences of the relevant task to obtain a frequency-of-use score or ratio); (b) timestamps indicating the dates and times of occurrence of the subtask; (c) an average execution time of the subtask, and (d) the average amount of time between initiation of the task and initiation of the subtask. This data, which may be obtained from feedback messages from the prefetch client 56, may be used to identify the subtasks that should be performed preemptively when a particular web page is requested. The timestamp data may also be used to effectively remove old feedback data from the mapping table 52, or to otherwise give greater weight to recent feedback data over old feedback data.

For example, in one implementation of the system of FIG. 1, the prefetch service 50 maintains an "occurrences" count for each task and each associated subtask represented in the table 52. Periodically, all of the occurrences counts for a given task are proportionally reduced, such as by dividing the count values by ten or by one hundred. This reduces the effect of old feedback data while preserving the basic information regarding the relative frequencies with which specific subtasks are performed.

Figure 2:
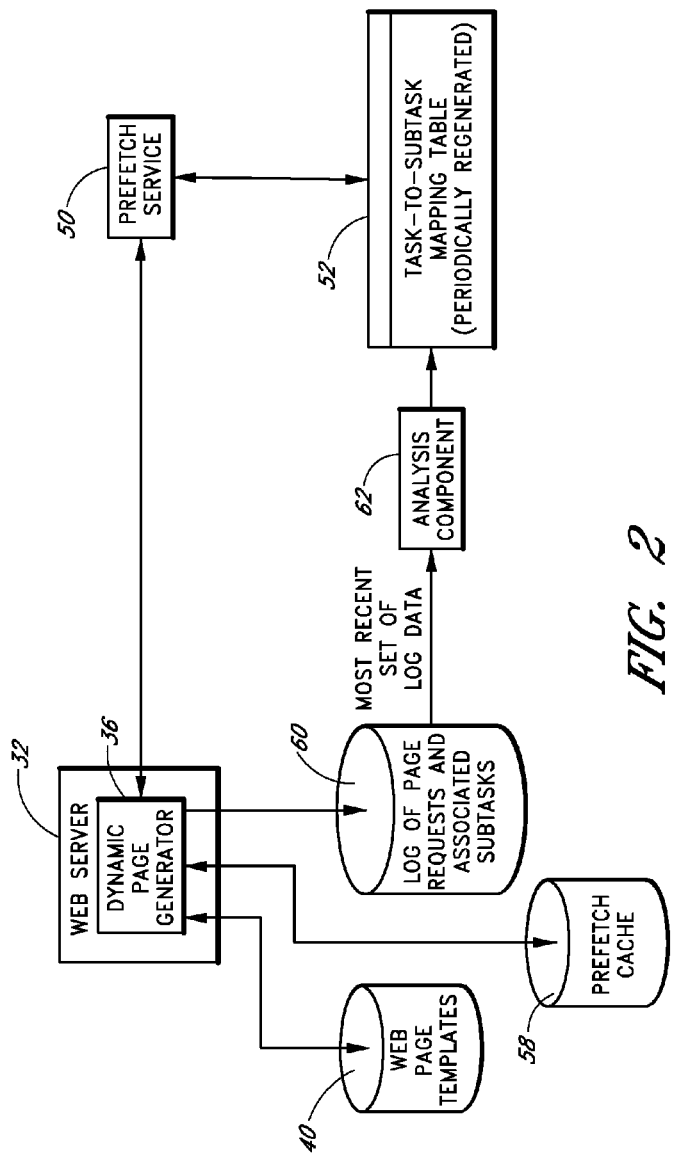
FIG. 2 illustrates one method that may be used to generate a task-to-subtask mapping table of the type shown in FIG. 1.

In another embodiment, which is depicted in FIG. 2, the feedback data regarding the actual service requests (subtasks) used to render specific web pages is stored in a separate database or other repository 60, rather than in the mapping table 52 itself. An analysis component 62 periodically analyzes a most recent set of the feedback data stored in this repository 60 to generate a replacement task-to-subtask mapping table 52, or to make updates to an existing version of this table 52. As part of this process, the analysis component 62 may identify those tasks for which a sufficient quantity of feedback data exists, and for which a sufficient degree of subtask consistency/predictability exists, to justify the creation of a table entry. Once these tasks have been identified, the analysis component 62 may use a subtask scoring algorithm to select those service requests or other subtasks that are to be included in the associated table entry.

In this embodiment of FIG. 2, the subtask profile portion 52B of a given table entry may simply list the subtasks that should be performed preemptively, without listing any associated statistical data. Subtask score values may, but need not, be included in such a table 52. The collected feedback/activity data may be stored in a log format as shown, although other formats, including preprocessed formats, may be used.

Referring again to FIG. 1, some of the subtask descriptions included in the table 52 may be "tokenized" descriptions in which actual input parameters are replaced by tokens. For example, the subtask description "Recommendations <USERID>" may be used to specify to the prefetch client 56 that a service called Recommendations should be called to obtain personalized recommendations for the particular user who is accessing the relevant page. The prefetch client 56 would recognize the string "USERID" as a token in this example, and replace it with the actual user ID for purposes of calling the Recommendations service. One example of how input parameter tokenization may be used is provided in section VI below.

III. Example Process Flow

Figure 3:
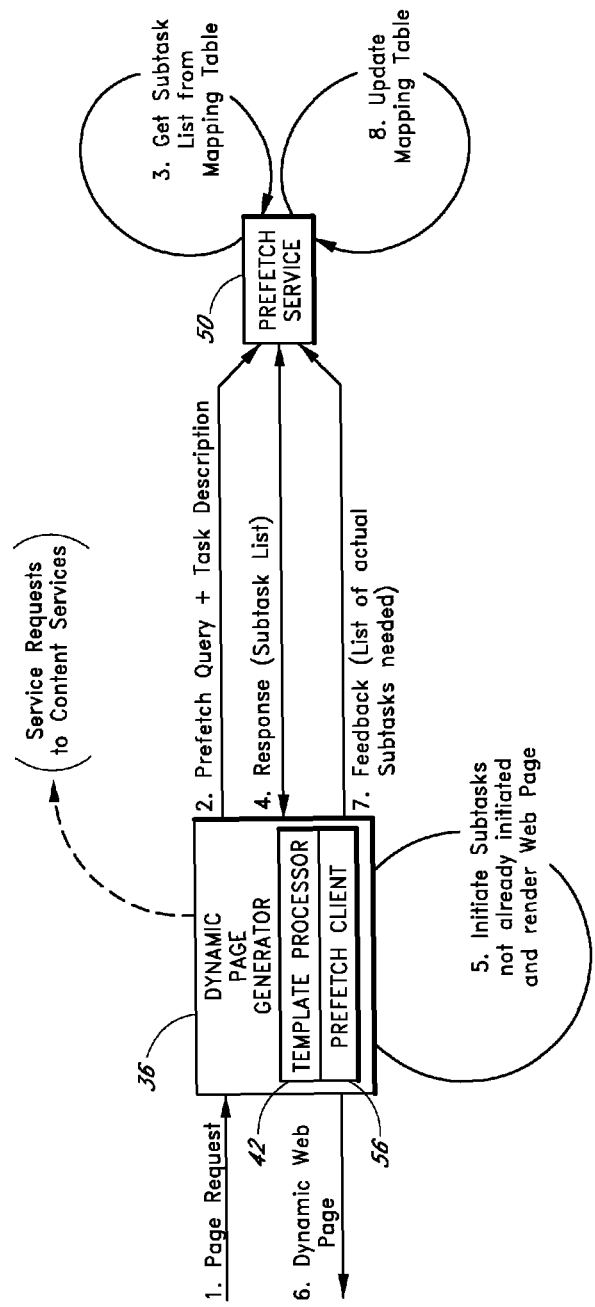
FIG. 3 illustrates a sequence of events that may occur when a web page is requested in the system of FIG. 1.

FIG. 3 illustrates the general sequence of interactions that occur, in one embodiment, between the dynamic page generator 36 and the prefetch service 50 in response to a web page request. This example assumes that the subtask profile data for the particular page generation task does not reside in the prefetch cache 58 and must therefore be retrieved from the prefetch service 50. The dynamic page generator 36 may send service requests to the content services 44 (as depicted by the dashed arrow) any time between events 2 and 6 of FIG. 3.

When a page request is initially received (event 1), the prefetch client 56 immediately intercepts the page request and, assuming the relevant subtask data does not reside in the prefetch cache 58, sends a prefetch query message (event 2) to the prefetch service 50. As illustrated, the prefetch query message is sent together with a description of the associated page generation task, as described above. The task description may, for example, consist of the URL of the requested web page ("target URL"), or may consist of information extracted from the target URL.

In addition, the task description sent with the prefetch query may, in some implementations, include parameters that are not part of the target URL. For example, the task description may include information about the user (e.g., recognized versus unrecognized), form data entered by the user, and/or state information descriptive of the user's browsing session. As with information contained within the URL, these parameters may be used to select the appropriate entry in the task-to-subtask mapping table 52.

For instance, if the page request (event 1) is a submission of a search query for conducting a general World Wide Web search, the search query itself may be passed to the prefetch service 50 and used to look up the appropriate set of subtasks. These subtasks may, for example, involve service requests for retrieving information about specific search result URLs/web pages. In this example, the task-to-subtask mapping table may include a separate entry for each of the most frequently submitted search queries.

As depicted by event 3 in FIG. 3, the prefetch service 50 responds to the prefetch query by looking up from the task-to-subtask mapping table 52 a listing of the subtasks that can be performed preemptively. As part of this process, the prefetch service 50 preferably maps the received task description to the most specific task ID 52A to which it corresponds. For instance, if the task description is the URL of a particular item detail page, the prefetch service may initially check to see if a table entry exists for this item detail page. If no such table entry exists, the service may fall back to a less specific table entry, such as one that encompasses all item detail pages. The table lookup operation can typically be performed relatively quickly in comparison to the overall page generation time. If no entry is found for the particular task description, the prefetch service may return a null response message.

In one embodiment, the query may optionally specify a score threshold, such as a minimum frequency-of-use score, for purposes of looking up subtasks from the table 52. In such cases, the prefetch service 50 looks up and returns a listing of those subtasks that meet or exceed this minimum score value. A fixed minimum score value may alternatively be used for all queries. Further, the minimum frequency-of-use score may be increased automatically when the content services 44 are heavily loaded (to reduce unnecessary service requests), and decreased when the content services are lightly loaded.

As depicted by event 4 in FIG. 3, assuming a table entry is found, the prefetch service 50 returns a response message that includes a listing of subtasks, such as those that satisfy the specified score threshold. The response message may also indicate whether this subtask data should be stored in the prefetch cache 58. The prefetch service 50 (or alternatively the prefetch client 56) may decide whether the subtask data for a particular task is to be cached based on collected data regarding the frequency of occurrence of that task, and possibly other criteria.

The response message (event 4) may also include information specifying whether, or how often, the prefetch client 56 should return end-of-page feedback messages for this particular task. For example, in one embodiment, the prefetch service 50 may indicate that feedback should be provided with a probability 1/N (e.g., 1/100), in which case the prefetch client will have a 1/N chance of providing feedback for this particular instance of the task. This feature may be used to inhibit the transmission of feedback messages for tasks that are very frequently performed, as may be desirable for reducing the load on the prefetch service 50. For instance, if a particular page is requested several times per second on the average, the prefetch service 50 will accumulate sufficient subtask data for this page even if feedback is provided for only a small fraction of the page generation events. The prefetch service 50 may select the feedback probability value for a particular task, or otherwise control the frequency with which feedback is provided for that task, based on collected data regarding the frequency of occurrence of that task, and possibly other criteria.

As depicted by event 5 in FIG. 3, the dynamic page generator 36 (and more specifically, the prefetch client 56) then initiates the subtasks specified by the prefetch service's response message, except for any such subtasks that have already been initiated by the template processor 42. Subtasks initiated preemptively by the prefetch client 56 are initiated on behalf of the template processor 42, before it is known whether the template processor will actually attempt to perform such subtasks. As mentioned above, each such subtask is in the form of a service request in the preferred embodiment, although other types of subtasks may be supported. Data retrieval subtasks initiated as the result of the prefetch service represent predictive prefetch events, as data is being retrieved based on a prediction that it will be used to generate the requested web page. As mentioned above, if the template processor 42 thereafter attempts to perform a subtask that has already been initiated preemptively, the dynamic page generator 36 may prevent the duplicate service request from being sent to the prefetch service 50.

If the subtasks that are to be performed preemptively include one or more service requests to the same content service 44, these service requests may optionally be combined or "batched" for sending to the relevant content service 44. For example, if it is determined that an Image service should be preemptively called twenty times to retrieve twenty separate images, these twenty service requests may be combined into a single service request to be sent to the Image service. The Image service may then return a single response that contains all twenty images. The use of service request batching in this manner reduces network traffic and conserves processing resources.

The service request responses received from the content services 44 are used by the template processor 42 to construct the requested web page. The web page may be constructed throughout events 2-5 of FIG. 3, and is returned to the user (event 6) upon completion.

In addition to subtask frequency-of-use data, various other criteria may be used in deciding whether a given subtask should be performed preemptively as part of a page generation task. For example, if a particular subtask takes much longer than other subtasks on the average, or is typically performed at the very end of a page generation task, it may be desirable to initiate this subtask preemptively even though its likelihood of use is only 50%. Further, the decision of whether to make a given service request preemptively may take into consideration the current load on the relevant service, so that unnecessary service requests are reduced or avoided when the service is heavily loaded.

In event 7, the dynamic page generator 36 sends a feedback message to the prefetch service 50 (assuming in this example that feedback is sent for this particular page request). This message preferably specifies the subtasks that were actually used to generate the web page. Other feedback data, such as the execution times of the service requests, may also be included in the feedback message. As mentioned above, the prefetch service 50 may inhibit or reduce the transmission of feedback messages if, for example, sufficient historical data already exists for the particular task. Feedback data regarding subtasks performed at the outset of the page generation task may optionally be excluded from the feedback messages.

In event 8, the prefetch service 50 updates the mapping table 52 to reflect the feedback provided by the dynamic page generator 36. As part of this process, the prefetch service 50 may update the score values associated with specific subtasks, and/or update data values used to generate such scores. Rather than performing these table updates in real time, a number of feedback messages can be aggregated, such that updates to the table are performed in batches.

If the prefetch service 50 is replicated across multiple servers 52B, each such server can update its own respective task-to-subtask mapping table 52 based on the feedback it receives. Because each such server 52B will receive similar feedback data over time for like tasks, these tables will evolve similarly over time, and will thus contain similar data at any given point of time. As a result, each instance of the prefetch service 50 can operate independently of other instances. For web pages that are accessed infrequently (e.g., once per hour), the prefetch service 50 may instruct the prefetch client 56 to send the feedback data to all of the prefetch servers 50B, such that each such server may update its respective table 52.

As described above with reference to FIG. 2, the feedback data can alternatively be maintained in a separate repository 60, and analyzed periodically by an analysis component 62 for purposes of generating the table 52. In such embodiments, each prefetch server 52 may use the table data most recently generated by the analysis component 62, without performing any table updates. Hybrid approaches are also possible in which some types of table updates are made in real time, and others are made based on an offline analysis of collected data.

Referring again to FIG. 1, although the use of a separate prefetch service 50 is preferred, it will be recognized that some or all of the functionality of this service can alternatively be implemented by the prefetch client 56 on the web server machine 32. For example, rather than sending a prefetch query to the prefetch service 50 when a page request is received, the prefetch client could look up a listing of the associated subtasks from a locally-stored mapping table 52. This locally-stored mapping table could be generated periodically by an off-line analysis component, as described above.

IV. Requesting Subtask Data for Both Specific and Generic Task IDs

One variation to the process described above is to allow the prefetch client 56 to request the subtask profile data for both the specific task ID and the generic task ID for a particular task. For example, when a page request is received for a relatively infrequently accessed item detail page, the prefetch client 56 may generate two prefetch service requests: one for the subtask profile 52B of the requested item detail page, and one for the subtask profile of the generic item detail page. In this example, the subtask data for the generic item detail page would much more likely reside in the prefetch cache 58, resulting in a cache hit. Consequently, the prefetch client 56 will be able to very rapidly identify, and preemptively initiate, those subtasks that are frequently performed for all item detail pages.

V. Predictive Execution of Subtasks of Other Subtasks

In the examples above, the prefetch service 50 was queried in response to a URL request. In some cases, it may additionally or alternatively be desirable to use the prefetch service 50 to identify subtasks to be performed preemptively as part of a particular page generation subtask. In such scenarios, the prefetch service 50 may be queried multiple times as part of a given page generation task, with different queries potentially occurring at different stages of this task.

To illustrate, assume hypothetically that the web site system 30 generates a "random detail page" that consists generally of the detail page content of three randomly selected items. To generate the random detail page, a service called "Random" is initially called to obtain three randomly selected item IDs. For each randomly selected item ID, the Catalog service is then called to obtain the associated catalog data, and the Similar Items service is called to obtain a listing of similar items. Finally, the catalog service is again called to obtain short descriptions of the similar items identified by the Similar Items service.

In this example, there would be little or no benefit to querying the prefetch service 50 when the random detail page is initially requested. This is because a very weak correlation exists between the task "random detail page" and the subtasks that will be performed to obtain the content for the randomly selected items. However, once the three randomly selected item IDs are known, the details of the remaining subtasks may be predictable. Thus, upon receiving the three item IDs from the Random service, the prefetch service 50 can be queried three times—once for each of the randomly-selected item IDs—to identify additional subtasks to be performed preemptively. The task ID passed to the prefetch service for each such query may be in the form "detail page content for <item ID>." Special tags or instructions may be included in the template of the random detail page specifying that the prefetch service is to be called for each item ID returned by the Random service.

As illustrated by this example, the tasks identified in the task ID portion 52A of the mapping table 52 need not come from a requested URL, or even be dependent upon a URL.

VI. Non-Catalog Based Applications

As will be apparent from the foregoing, the predictive prefetching methods described above are not limited to the generation of catalog pages, or to systems that provide access to online catalogs. Rather, the methods are generally applicable to any document generation task in which subtasks that are dependent upon the results other subtasks can be predicted based on prior document generation events.

One application for the predictive prefetch methods involves the dynamic generation of Web search result pages. For purposes of illustration, assume that the Web site system 30 implements a Web search engine that allows users to conduct general (non-site-specific) searches for web pages. Assume also that the Web search engine generates personalized Web search results pages that identify to users those search result URLs they have previously accessed. To generate such a personalized search results page, the dynamic page generator 36 initially sends the user's search query to a Web search service 44. The Web Search service 44 responds by returning a listing the URLs of web pages that are responsive to the search query, as reflected within an index generated by a web crawler program.

For each URL returned by the Web Search service 44, the dynamic page generator 36 then queries a Clickstream History service 44 to find out whether the particular user has previously accessed that URL. In this example, the task-to-subtask mapping table 52 could include a separate table entry for each of the most commonly submitted search queries, or those that satisfy some other search query bounding criteria. For example, the table entry for the task ID "results page for query=storage area networks" would specify the URLs returned the most frequently for this query, and would specify that each such URL is to be passed to the Clickstream History service together with the user's ID. This would allow some or all of the requests to the Clickstream History service to be made before the Web Search service 44 returns its results.

In this example, the service requests to the Clickstream History service may be specified in the mapping table 52 in a tokenized form, such that separate table entries are not created for specific users. Specifically, although each request to the Clickstream History service will specify a particular user ID, the mapping table 52 may specify the service request in the form of "Clickstream History (URL, USERID)," where "URL" is an actual URL and "USERID" is a token that replaces actual user IDs. If a user having an ID of 12345 submits a search query for which such a table entry exists, the prefetch client would retrieve the subtask description, and replace "USERID" with "12345" for purposes of calling the Clickstream History service. If feedback is thereafter returned for this particular page request, the feedback message will specify the subtask in its tokenized form. Specifically, rather than indicating that the service request "Clickstream History (URL, 12345)" was made, the prefetch client 56 will indicate to the prefetch service 50 that the service request "Clickstream History (URL, USERID)" was made.

VII. Conclusion

The various inventive features described above may also be used to dynamically generate displays and display elements other than documents. For example, the invention may be used to generate a screen display, or a portion of a screen display, that contains data retrieved from multiple sources. Further, although the invention has been described primarily in the context of data retrieval subtasks, the invention may also be used, in some embodiments, to preemptively initiate subtasks that do not involve the retrieval or return of any data.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims.

What is claimed is:

1. A computer-implemented method, comprising:
    monitoring, within a dynamic page generation system, dynamic page generation events associated with a set of one or more Uniform Resource Locators (URLs), said monitoring comprising maintaining statistical data regarding how frequently the dynamic page generation system performs particular content retrieval tasks as part of the dynamic page generation events;
    generating, based at least partly on the statistical data, a mapping table that maps the set of one or more URLs to a set of content retrieval tasks, the mapping table identifying, for a first URL in the set, a plurality of content retrieval tasks previously performed by the dynamic page generation system to retrieve content used to dynamically generate corresponding pages, said mapping table stored in computer memory; and
    responding, by the dynamic page generation system, to a page request from a user computing device by (1) determining that the page request corresponds to the first URL, (2) using the mapping table to identify and preemptively initiate the plurality of content retrieval tasks to predictively retrieve content for dynamically generating a page in response to the page request, (3) dynamically generating a page in response to the page request, wherein dynamically generating the page comprises determining which of a plurality of items of the predictively retrieved content to use to dynamically generate the page, and (4) transmitting the dynamically generated page on a network to the user computing device;
    said method performed in its entirety by a computing system that comprises a server machine.

2. The method of claim 1, wherein responding to the page request further comprises preemptively performing the plurality of content retrieval tasks while the page is being generated.

3. The method of claim 2, further comprising determining whether any of the preemptively performed content retrieval tasks were performed unnecessarily.

4. The method of claim 1, wherein responding to the page request further comprises using content service load levels to determine whether particular content retrieval tasks identified from said mapping table are to be performed preemptively.

5. The method of claim 1, wherein at least some of the monitored page generation events are initiated by different users than other monitored page generation events, such that the mapping table is reflective of page generation events initiated by a plurality of users.

6. The method of claim 1, wherein generating the mapping table comprises selecting, for inclusion in the mapping table for a particular URL, a set of content retrieval tasks that satisfy a frequency-of-occurrence threshold for the particular URL.

7. The method of claim 1, wherein generating the mapping table comprises incorporating at least some of the statistical data into mapping table, and wherein using the mapping table comprises using the incorporated statistical data to select a content retrieval task to perform preemptively.

8. The method of claim 1, wherein the set of one or more URLs consists of a single URL.

9. The method of claim 1, wherein the set of one or more URLs comprises multiple URLs that correspond to a common page template.

10. The method of claim 1, wherein the content retrieval tasks include service requests.

11. A dynamic page generation system, comprising:
    a predictive prefetch service that maintains, in computer storage, a mapping of Uniform Resource Locators (URLs) to corresponding content retrieval tasks, said mapping reflective of statistical data regarding how frequently specific content retrieval tasks are performed by the dynamic page generation system in dynamically generating pages associated with particular URLs, said statistical data based on monitored page generation events initiated by user computing devices; and
    a server that dynamically generates pages in response to page requests from user computing devices, said server programmed to respond to a request from a user computing device for a page corresponding to a first URL by a process that comprises (1) using the mapping to identify one or more corresponding content retrieval tasks previously performed in generating pages associated with the first URL, (2) preemptively performing the one or more identified content retrieval tasks to prefetch content for generating the page, (3) dynamically generating the page in response to the request, wherein dynamically generating the page comprises determining which of a plurality of items of the prefetched content to use to generate the page, and (4) transmitting the generated page on a network to the user computing device.

12. The system of claim 11, wherein the server, by preemptively performing the one or more content retrieval tasks, reduces a page generation time relative to a time required to generate the page without preemptive performance of the one or more content retrieval tasks.

13. The system of claim 11, wherein the mapping comprises at least some of the statistical data.

14. The system of claim 11, wherein the mapping includes at least one entry that (1) specifies a plurality of URLs that correspond to a common page template, and (2) maps the plurality of URLs to a corresponding set of content retrieval tasks.

15. The system of claim 11, wherein the predictive prefetch service is configured to update the mapping automatically to reflect content retrieval tasks used to generate requested pages.

16. The system of claim 11, wherein the predictive prefetch service is implemented at least partly on a machine that is separate from the server.

17. Non-transitory computer storage having stored thereon program instructions that instruct a server of a dynamic page generation system to respond to a page request from a user computing device by a process that comprises:
- selecting, in response to the page request, based at least partly on statistical data regarding content retrieval tasks previously used by the dynamic page generation system to dynamically generate at least one page associated with the page request, a content retrieval task to perform preemptively;
- preemptively performing the selected content retrieval task in response to the page request, to thereby predictively prefetch content for potential use in dynamically generating a page in response to the page request;
- dynamically generating the page in response to the page request, wherein dynamically generating the page comprises determining whether to use the predictively prefetched content to generate the page; and
- sending the dynamically generated page to the user computing device.

18. The non-transitory computer storage of claim 17, wherein the statistical data is reflective of page generation events initiated by a plurality of user computing devices.

19. The non-transitory computer storage of claim 17, wherein the statistical data is reflective of monitored page generation events associated with a particular Uniform Resource Locator.

20. The non-transitory computer storage of claim 17, wherein the content retrieval task is selected based additionally on content service load levels.

21. A system for responding to content requests, comprising:
- a computing system comprising one or more physical machines configured to implement a dynamic resource generation system, said computing system programmed to at least:
  - maintain, in computer storage, a mapping of resource identifiers to corresponding content retrieval tasks, said mapping reflective of statistical data regarding how frequently specific content retrieval tasks are performed by the dynamic resource generation system in dynamically generating resources associated with particular resource identifiers, said statistical data based on monitored resource generation events initiated by user computing devices, wherein the mapping specifies, for a first resource identifier, content retrieval tasks previously performed to retrieve content used to dynamically generate a corresponding resource; and
  - dynamically generate resources in response to resource requests from user computing devices, wherein a response to a request from a user computing device for a resource corresponding to the first resource identifier is generated by a process that comprises (1) using the mapping to identify the previously performed content retrieval tasks, (2) preemptively performing at least some of the previously performed content retrieval tasks to prefetch content for generating the resource, (3) determining which of a plurality of items of the prefetched content to use to generate the resource, (4) dynamically generating the resource, and (5) sending the resource on a network to the user computing device.

22. The system of claim 21, wherein the process further comprises updating the mapping based on the determination of which of the plurality of items to use to generate the resource.

23. The method of claim 1, further comprising:
- identifying, from the plurality of preemptively-initiated content retrieval tasks, a content retrieval task that was performed unnecessarily; and
- updating the mapping table to reflect a determination that the identified content retrieval task was performed unnecessarily.

* * * * *